US010133336B2

(12) United States Patent
Wang et al.

(10) Patent No.: US 10,133,336 B2
(45) Date of Patent: Nov. 20, 2018

(54) DYNAMICALLY ENTERING LOW POWER STATES DURING ACTIVE WORKLOADS

(71) Applicants: Ren Wang, Portland, OR (US); Tsung-Yuan C. Tai, Portland, OR (US); Jr-Shian Tsai, Portland, OR (US); Bruce L. Fleming, Morgan Hill, CA (US); Rajeev D. Muralidhar, Bangalore (IN); Mesut A. Ergin, Portland, OR (US); Prakash N. Iyer, Portland, OR (US); Harinarayanan Seshadri, Bangalore (IN)

(72) Inventors: Ren Wang, Portland, OR (US); Tsung-Yuan C. Tai, Portland, OR (US); Jr-Shian Tsai, Portland, OR (US); Bruce L. Fleming, Morgan Hill, CA (US); Rajeev D. Muralidhar, Bangalore (IN); Mesut A. Ergin, Portland, OR (US); Prakash N. Iyer, Portland, OR (US); Harinarayanan Seshadri, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 255 days.

(21) Appl. No.: 14/128,945

(22) PCT Filed: Nov. 27, 2012

(86) PCT No.: PCT/US2012/066656
§ 371 (c)(1),
(2) Date: Dec. 23, 2013

(87) PCT Pub. No.: WO2013/082030
PCT Pub. Date: Jun. 6, 2013

(65) Prior Publication Data
US 2014/0258749 A1 Sep. 11, 2014

(51) Int. Cl.
*G06F 1/32* (2006.01)

(52) U.S. Cl.
CPC .......... *G06F 1/3234* (2013.01); *G06F 1/3287* (2013.01); *Y02D 10/171* (2018.01); *Y02D 50/20* (2018.01)

(58) Field of Classification Search
CPC .... G06F 1/3203; Y02B 60/1203; Y02B 60/34
See application file for complete search history.

(56) References Cited

U.S. PATENT DOCUMENTS 8,024,590 B2 9/2011 Song et al.
2003/0105983 A1 6/2003 Brakmo et al.
(Continued)

FOREIGN PATENT DOCUMENTS

CN 1955887 A 5/2007
CN 101067758 A 11/2007
(Continued)

OTHER PUBLICATIONS

Supplementary European Search Report for European Application No. 12853783.4, dated Jun. 25, 2015, 7 pages, European Patent Office.
(Continued)

*Primary Examiner* — Paul Yen
(74) *Attorney, Agent, or Firm* — Jordan IP Law, LLC (57) ABSTRACT

Systems and methods may provide for identifying runtime information associated with an active workload of a platform, and making an active idle state determination for the platform based on at least in part the runtime information. In addition, a low power state of a shared resource on the platform may be controlled concurrently with an execution of the active workload based on at least in part the active idle state determination.

20 Claims, 4 Drawing Sheets

(56) References Cited

U.S. PATENT DOCUMENTS

| | | | | |
|---|---|---|---|---|
| 2006/0149977 | A1* | 7/2006 | Cooper | G06F 1/3215 713/300 |
| 2007/0094525 | A1 | 4/2007 | Uguen et al. | |
| 2008/0271035 | A1* | 10/2008 | Yasukawa | G06F 1/3203 718/104 |
| 2008/0288802 | A1 | 11/2008 | Fleck et al. | |
| 2009/0150695 | A1 | 6/2009 | Song et al. | |
| 2009/0249094 | A1* | 10/2009 | Marshall | G06F 1/3203 713/320 |
| 2010/0115314 | A1 | 5/2010 | Sultenfuss | |
| 2010/0169684 | A1 | 7/2010 | Jeyaseelan et al. | |
| 2010/0169685 | A1 | 7/2010 | Gough et al. | |
| 2010/0287396 | A1 | 11/2010 | Barth et al. | |
| 2011/0154080 | A1 | 6/2011 | Wang et al. | |
| 2011/0173474 | A1 | 7/2011 | Salsbery et al. | |

FOREIGN PATENT DOCUMENTS

| | | |
|---|---|---|
| CN | 101853065 A | 10/2010 |
| CN | 101963837 A | 2/2011 |
| EP | 1780624 A2 | 2/2007 |
| TW | 200521709 A | 7/2005 |
| WO | 2011/085330 A1 | 7/2011 |
| WO | 2013/082030 A1 | 6/2013 |

OTHER PUBLICATIONS

Office Action received for Taiwanese Patent Application No. 101143111, dated Nov. 28, 2014, 10 pages icluding 5 pages of English translation.

Office Action received Chinese Patent Application No. 201280058675.0, dated Nov. 25, 2015, 25 pages including 17 pages of English translation.

International Search Report and Written Opinion received for PCT Patent Application No. PCT/US2012/066656, dated Feb. 28, 2013, 9 pages.

Office Action received for Taiwan Patent Application No. 101143111, dated Jul. 15, 2014, 6 pages of Office Action and 5 Pages of English Translation.

International Preliminary Report on Patentability and Written Opinion received for PCT Patent Application No. PCT/US2012/066656 dated Jun. 12, 2014, 6 pages.

Office Action for Chinese Patent Application No. 201280058675.0, dated Aug. 1, 2016, 7 pages including 4 pages of English translation.

Notice of Grant for Chinese Patent Application No. 201280058675.0, dated Feb. 14, 2017, 4 pages including 2 pages of English translation.

* cited by examiner

DYNAMICALLY ENTERING LOW POWER STATES DURING ACTIVE WORKLOADS

CROSS-REFERENCE TO RELATED APPLICATIONS

The present application is related to U.S. patent application Ser. No. 12/888,855, filed on Sep. 23, 2010, and U.S. patent application Ser. No. 12/644,720, filed on Dec. 22, 2009.

BACKGROUND

Technical Field

Embodiments generally relate to power management in computing platforms. More particularly, embodiments relate to the use of low power states during active workloads.

Discussion

In conventional mobile computing platforms, low power states may be used to reduce power consumption and extend battery life. The usage of low power states may be limited, however, to time periods when the platform is idle. Such an approach may not achieve optimal energy efficiency and performance in certain circumstances.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
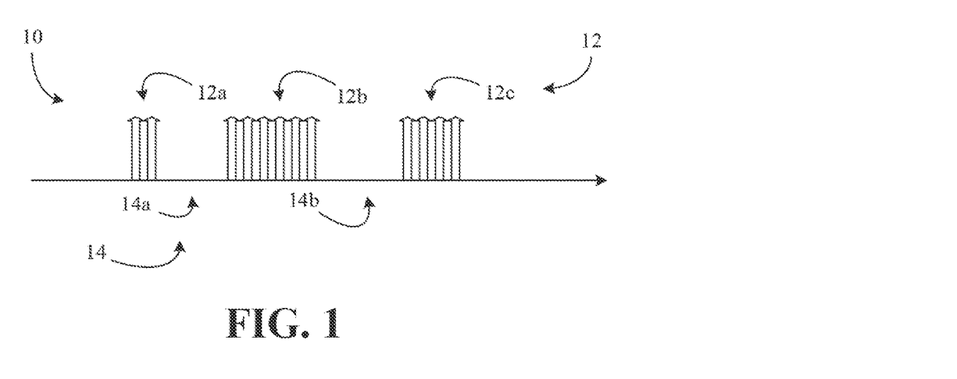
FIG. 1 is a timeline of an example of an active workload having active idle windows according to an embodiment.

Turning now to FIG. 1, a timeline of an active workload 10 for a platform is shown in which a plurality of active windows 12 (12a-12c) are interspersed with a plurality of "active idle" windows 14 (14a, 14b). The active workload 10 could correspond to a computing activity (e.g., web browsing, video playback, etc.) that utilizes far less than 100% of the processing resources of the platform. Thus, while the platform may perform tasks, execute operations, process events, and so forth, during the active windows 12, at least a portion of the platform may be inactive/idle during the active idle windows 14. As will be discussed in greater detail, rather than maintaining the platform in a relatively high power state during execution of the active workload 10, a strategy may be employed in which the platform is placed in an "active idle state" to optimize platform power consumption during execution of the active workload 10.

Figure 2:
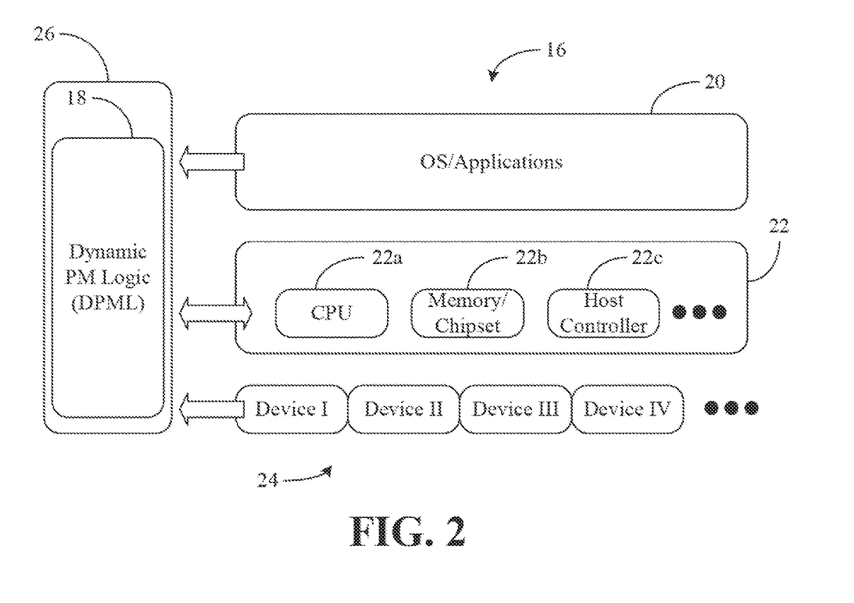
FIG. 2 is a block diagram of an example of dynamic power management logic according to an embodiment.

FIG. 2 shows a block diagram of a platform 16 having software (e.g., operating system/OS, applications) 20, shared resources 22 (22a-22c), and devices 24. The platform 16 may be part of a mobile platform having computing functionality (e.g., personal digital assistant/PDA, laptop, smart tablet), communications functionality (e.g., wireless smart phone), imaging functionality, media playing functionality (e.g., smart television/TV), or any combination thereof (e.g., mobile Internet device/MID). The shared resources 22 may therefore include, for example, one or more processors such as a CPU (central processing unit) 22a, one or more supporting components 22b such as a memory structure and/or chipset, and one or more host controllers 22c such as a USB (Universal Serial Bus, e.g., USB Specification 3.0, USB Implementers Forum) controller. In addition, the devices 24 may include storage (e.g., flash drives, hard disk drives, solid state disks), network controllers, audio input/output (IO) devices, peripheral devices, and so forth. Thus, the devices 24 might interact with the platform 16 via the shared resources 22, and could be considered downstream components with respect to the shared resources 22 to the extent that a given device 24 has a power dependency on a particular shared resource 22.

The illustrated platform 16 also includes dynamic power management logic (DPML) 18 that obtains runtime information from the software 20, shared resources and devices 24, and makes active idle state determinations for the platform 16 based on the runtime information. The runtime information, which can be associated with an active workload of the platform 16, may include, for example, idle duration information, latency tolerance requirement (LTR) information, resource requirement information, and so forth. As will be discussed in greater detail, the runtime information can enable the logic 18 to determine whether to place one or more of the shared resources 22 and/or devices 24 in a low power state during execution of the active workload. The low power state could be an ACPI (Advanced Configuration and Power Interface, e.g., ACPI Specification, Rev. 4.0a, Apr. 5, 2010) state or other appropriate low power state. While the logic 18 is shown as residing on a separate component 26, the logic 18 could be implemented elsewhere on the platform 16 such as in the software 20, in the shared resources 22, in the devices 24, or any combination thereof.

Figure 3A:
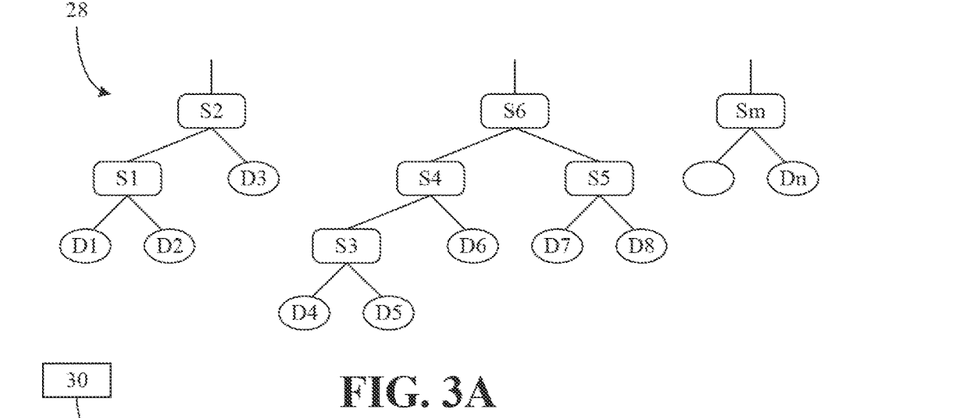
FIGS. 3A-3C are block diagrams of examples of system power hierarchies according to embodiments.

Turning now to FIG. 3A a system power hierarchy 28 is shown in which different nodes of a system have different power dependencies. In the illustrated example, a shared resource "S1" has the devices "D1" and "D2" (e.g., leaf nodes) as downstream components, and the shared resource S1 is itself a downstream component of another shared resource "S2" (along with another device "D3"). Thus, the decision of whether to place the shared resource S1 in a low power state may depend at least in part on the status of the devices D1 and D2. Similarly, the decision of whether to place the shared resource S2 in a low power state may depend at least in part on the status of the shared resource S1 and the device D3, in the example shown. In particular, the leaf nodes may autonomously manage their own power states according to workloads, and might be able to enter certain low power states by themselves when long enough idle durations such as active idle windows 14 (FIG. 1) are detected. For example, when a user is watching local video playback without network activity, a network controller of the platform could enter a low power state, and a CPU of the platform could enter a low power state when it is idle. In turn, if all nodes depending from a given shared resource are in a low power state, the shared resource in question can potentially enter a lower power state as well.

Figure 3B:
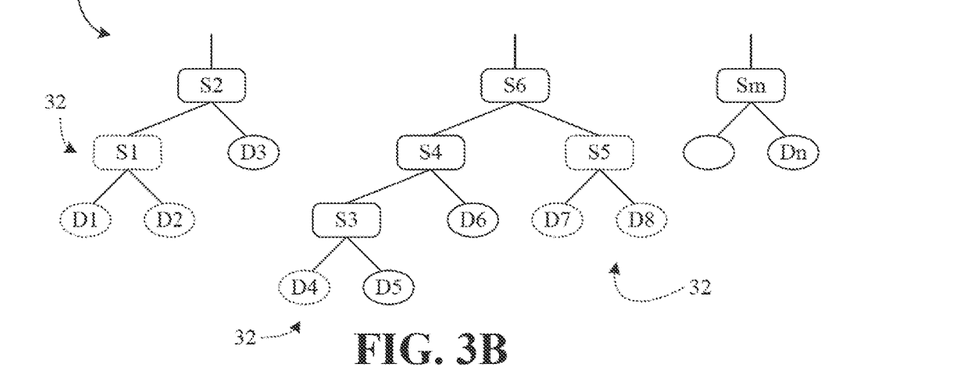

FIG. 3B demonstrates a scenario in which a system power hierarchy 30 includes a set of low power nodes 32. In the illustrated example, the shared resource S1 has been placed in a low power state because its downstream component devices D1 and D2 are also in a low power state. Similarly, a shared resource node "S5" has been placed in a low power state because its downstream component devices "D7" and "D8" are also in a low power state. A shared resource "S3", on the other hand, is maintained in an active state because one of its downstream component devices, "D5", is not in a low power state.

The decision of whether to place a shared resource or device in a low power state may also depend, however, on other runtime factors. For example, a shared resource or device might not be able to enter a low power state if a projected active idle window is shorter than the energy break-even time fir the low power state in question. In this regard, there may be transition-related power consumption overhead as well as latency overhead that could offset the advantages associated with the reduced power consumption of a low power state if the active idle window is not long enough. Thus, the energy break-even time can generally indicate the amount of time the component would have to remain idle in order to justify transitioning to and from the low power state under consideration.

Latency tolerance requirements may also be a consideration. For example, if the resume latency of a low power state is longer than the latency tolerance requirement (LTR) associated with a certain workload, the component could be maintained in the active state in order to satisfy the LTR. In addition, some workloads can have specific resource requirements, wherein if a shared resource is included in the resource requirement for the workload, then that shared resource may be prevented from entering a low power state during execution of that workload.

Figure 3C:
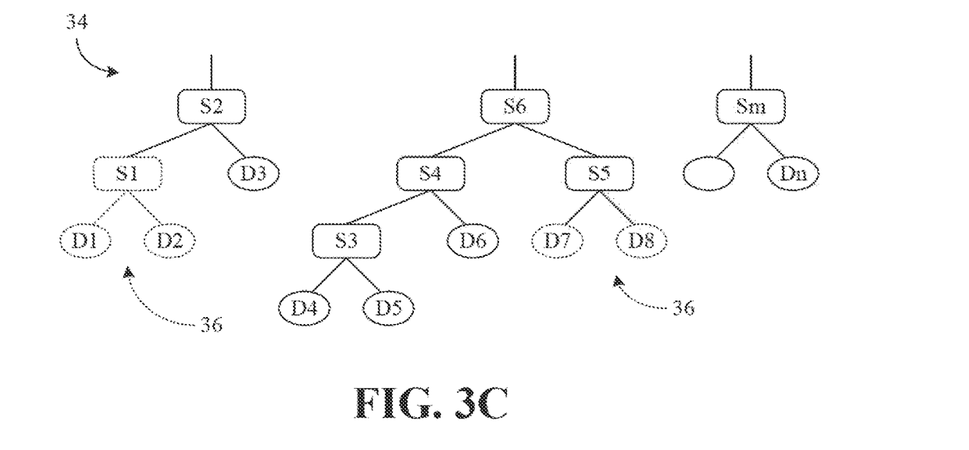

Thus, FIG. 3C shows a system power hierarchy 34 in which a set of low power nodes 36 includes the downstream component devices D7 and D8, but does not include the shared resource S5. In the illustrated example, the shared resource S5 might have been maintained in the active state because, for example, the active idle window does not exceed the energy break-even time of a low power state of the shared resource S5, the latency of the low power state exceeds a latency tolerance requirement of the active workload, a resource requirement of the active workload includes the shared resource S5, and so forth.

Figure 4:
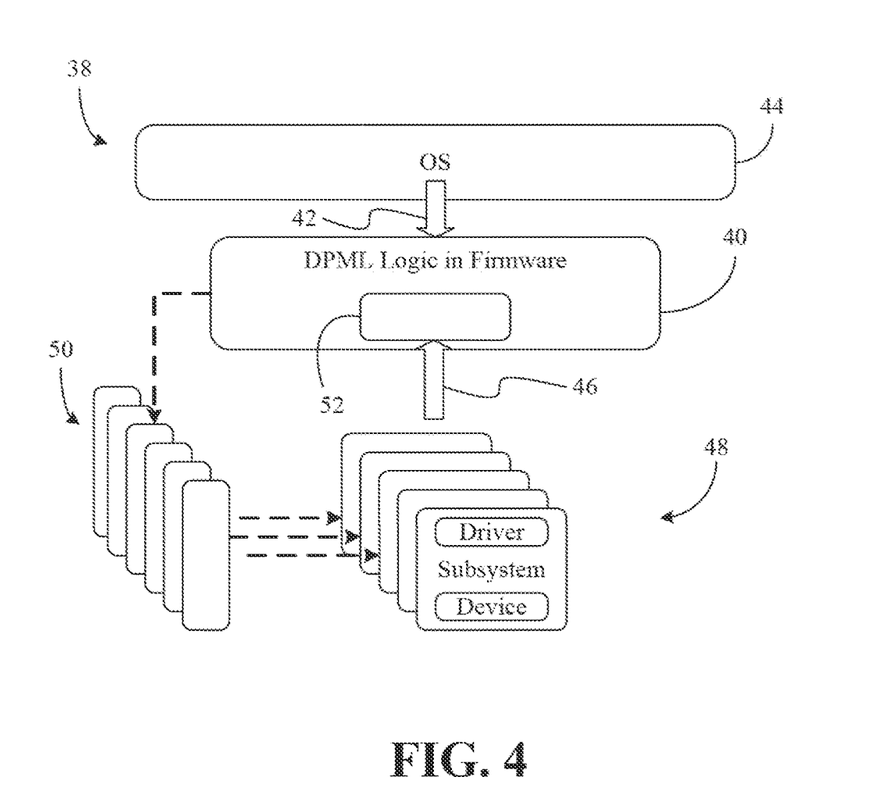
FIG. 4 is a block diagram of an example of dynamic power management logic implemented in firmware according to an embodiment.

FIG. 4 shows a platform 38 in which dynamic power management logic such as the DPML 18 (FIG. 2) is implemented in firmware 40. In the illustrated example, runtime information 42 is obtained from an operating system (OS) 44, wherein the runtime information 42 might include Quality of Service (QoS) information such as monitor-wait (mwait) instructions, idle duration information such as "time to next timer event" (TNTE) information, and so forth. The mwait instructions from the OS 44 could imply software latency requirements, and the TNTE information might also be used as a "hint" to determine the next idle duration. The TNTE information can either be communicated from the OS 44 to the firmware 40, or accessed via an OS timer. The illustrated firmware 40 also receives runtime information 46 from one or more platform devices/subsystems 48, which could include device drivers, and so forth. Idle duration information may also be obtained from an interrupt handler unit (not shown) residing in the firmware 40, and/or elsewhere in the platform 38.

The illustrated firmware 40 uses the runtime information 42, 46 to make active idle state determinations for the platform 38, and to control low power states of one or more shared resources 50 of the platform 38 during execution of active workloads. In particular, the firmware 40 may conduct fine grained power management by dynamically placing one or more of the shared resources 50 into active idle states based at least in part on the active idle state determinations. In addition, one or more of the devices 48 may be downstream components with respect to the shared resources 50. Accordingly, the active idle state determinations may take into consideration the runtime information 42, 46 in order to ensure optimal operation of the platform 38 with regard to latency, break-even times, resource requirements, etc. The firmware 40 may also include a break-event module 52 to coalesce and/or align break events in order to create active idle windows that may be used to more efficiently manage platform power. Implementing the illustrated dynamic power management logic in the firmware 40 may minimize modifications to the OS 44, enable the component with the best knowledge of the platform status to be leveraged in active idle state determinations, and reduce operation latency by using a component a component that is closer to hardware than the OS kernel. Other system implementations, however, may also be used.

Figure 5:
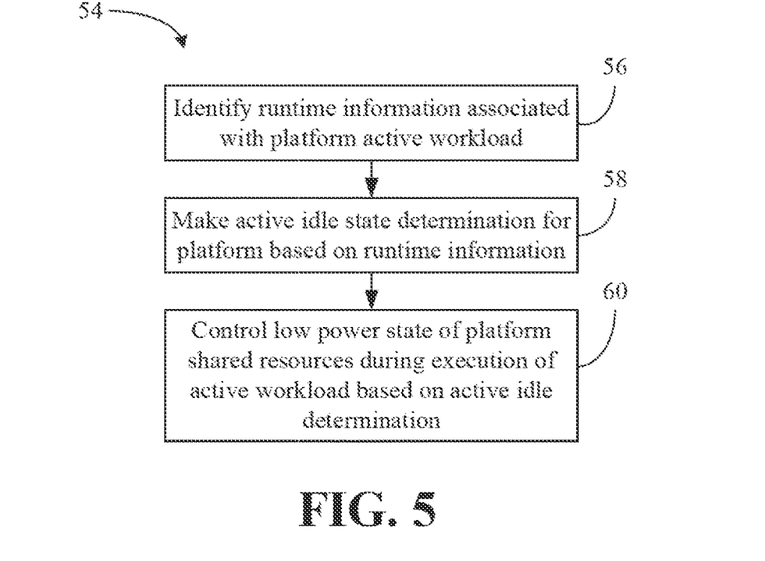
FIG. 5 is a flowchart of an example of a method of implementing active idle states in a platform according to an embodiment.

Turning now to FIG. 5, a method 54 of implementing active idle states is shown. The method 54 may be implemented as a set of logic instructions stored in a machine- or computer-readable storage medium such as random access memory (RAM), read only memory (ROM), programmable ROM (PROM), firmware, flash memory, etc., in configurable logic such as programmable logic arrays (PLAs), field programmable gate arrays (FPGAs), complex programmable logic devices (CPLDs), in fixed-functionality logic hardware using circuit technology such as application specific integrated circuit (ASIC), complementary metal oxide semiconductor (CMOS) or transistor-transistor logic (TTL) technology, or any combination thereof.

Illustrated processing block 56 provides for identifying runtime information associated with an active workload of a platform. An active idle state determination may be made for the platform at block 58 based on at least in part the runtime information. In addition, block 60 provides for controlling a low power state of one or more shared resources on the platform during execution of the active workload based on at least in part the active idle state determination.

Figure 6:
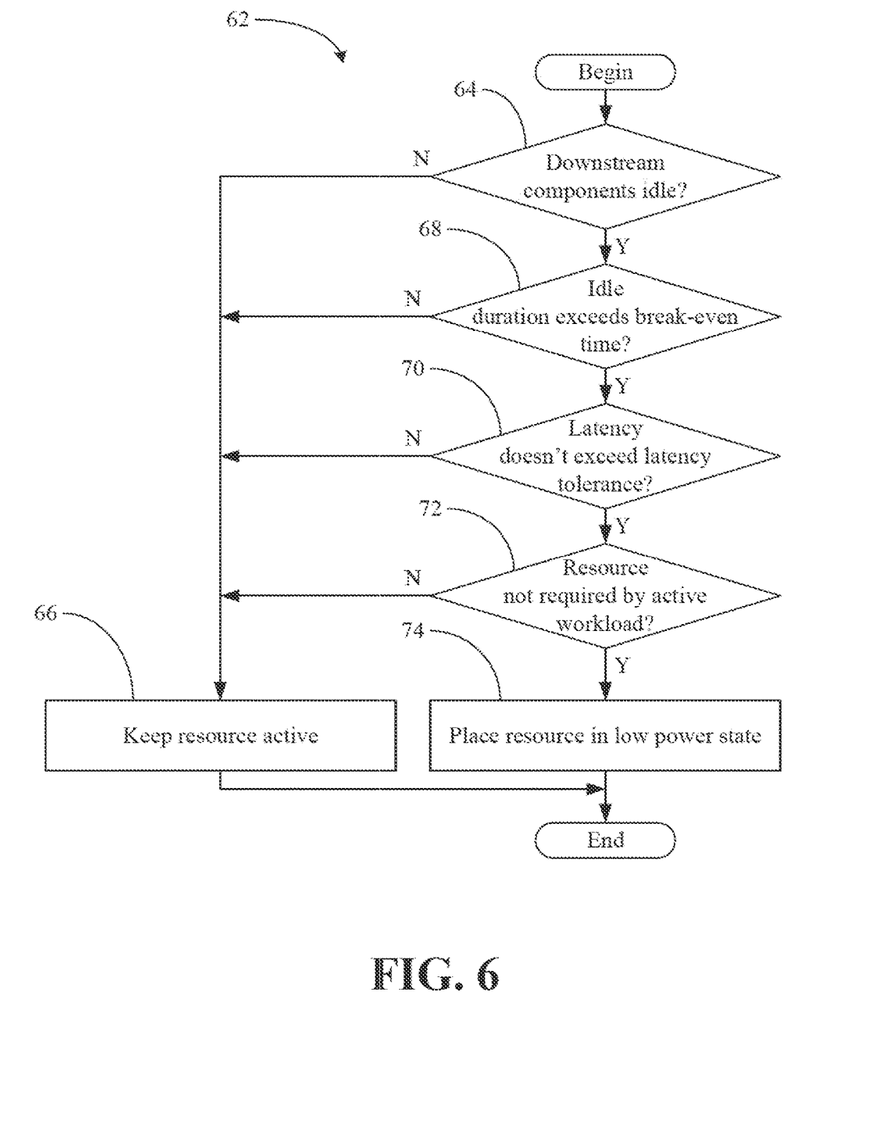
FIG. 6 is a flowchart of an example of a method of making active idle state determinations and controlling low power states according to an embodiment.

FIG. 6 shows one approach to making active idle state determinations and controlling low power states in greater detail. Generally, a method 62 might be conducted for a low power state of a shared resource during execution of an active load. In particular, illustrated block 64 provides for determining whether all of the downstream components of the shared resource are idle. If not, illustrated block 66 keeps the shared resource in the active state. Otherwise, a determination may be made at block 68 as to whether an idle duration (e.g., active idle window) associated with the active workload exceeds an energy break-even point of the low power state. As already noted, energy break-even points may be deployed in order to ensure that low power state transitions take into account latency and power consumption overhead.

Illustrated block 70 confirms that the resume latency of the low power state does not exceed any latency tolerance requirements of the active workload, while block 72 may confirm that the shared resource is not included in any resource requirements associated with the active workload. If the conditions in the illustrated blocks 64, 68, 70 and 72 are satisfied, block 74 may place the shared resource in the low power state, wherein the method 62 may be conducted for each shared resource of a platform. Moreover, a given shared resource may have multiple potential low power states, wherein the method 62 could be conducted for each low power state of the shared resource.

Techniques described herein may therefore introduce dynamic platform low power states, e.g., "active idle states", that enable optimal platform power management during active workloads. In particular, dynamic power management logic may determine how the platform should enter active idle states to dynamically maximize platform power savings. Such an approach can enable longer battery life under usage models that traditionally have limited ability to conserve power.

Embodiments may therefore provide for a computer implemented method in which runtime information associated with an active workload of a platform is identified. The method may also involve making an active idle state determination for the platform based on at least in part the runtime information. In addition, a low power state of a shared resource on the platform may be controlled concurrently with an execution of the active workload based on at least in part the active idle state determination.

Embodiments may also include a non-transitory computer readable storage medium having a set of instructions which, if executed by a processor, cause a platform to identify runtime information associated with an active workload of the platform. The instructions can also cause the platform to make an active idle state determination for the platform based on at least in part the runtime information, and control a low power state of a shared resource on the platform concurrently with an execution of the active workload based on at least in part the active idle state determination.

In addition, embodiments can include an apparatus having logic to identify runtime information associated with an active workload of a platform, and make an active idle state determination for the platform based on at least in part the runtime information. The logic may also control a low power state of a shared resource on the platform concurrently with an execution of the active workload based on at least in part the runtime information.

Other embodiments may include a platform having a shared resource and logic to identify runtime information associated with an active workload of the platform. The logic can also make an active idle state determination for the platform based on at least in part the runtime information, and control a low power state of the shared resource concurrently with an execution of the active workload based on at least in part the active idle state determination.

Embodiments of the present invention are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A computer implemented method comprising:
    identifying runtime information associated with an active workload of a platform, wherein the runtime information includes one or more of an idle duration associated with the active workload, a latency tolerance requirement associated with the active workload, or a resource requirement associated with the active workload;
    making an active idle state determination for the platform based on at least in part the runtime information;
    controlling a low power state of a shared resource on the platform concurrently with an execution of the active workload to reduce platform power consumption during execution of the active workload based on at least in part the active idle state determination, wherein the shared resource is one of a plurality of shared resources that form a power hierarchy including different nodes having different power dependencies, and wherein the shared resource is a downstream component that serves as a node of another shared resource; and
    placing the shared resource in the low power state if,
        one or more downstream components of the shared resource are idle, and
        the idle duration associated with the active workload exceeds an energy break-even time associated with the low power state, wherein entering the low power state depends at least in part on a status of an upstream shared resource and one or more downstream components, and wherein each of the one or more downstream components autonomously manages a power state associated with the downstream component.

2. The method of claim 1, further including accessing an operating system timer to identify the idle duration.

3. The method of claim 1, further including receiving the idle duration from an interrupt handler unit.

4. The method of claim 1, further including placing the shared resource in the low power state if,
one or more downstream components of the shared resource are idle, and
a latency associated with the low power state does not exceed the latency tolerance requirement.

5. The method of claim 1, further including placing the shared resource in the low power state if,
one or more downstream components of the shared resource are idle, and
the resource requirement does not include the shared resource.

6. A non-transitory computer readable storage medium comprising a set of instructions which, if executed by a processor, cause a platform to:
identify runtime information associated with an active workload of the platform, wherein the runtime information is to include one or more of an idle duration associated with the active workload, a latency tolerance requirement associated with the active workload, or a resource requirement associated with the active workload;
make an active idle state determination for the platform based on at least in part the runtime information;
control a low power state of a shared resource on the platform concurrently with an execution of the active workload to reduce platform power consumption during execution of the active workload based on at least in part the active idle state determination, wherein the shared resource is to be one of a plurality of shared resources that form a power hierarchy including different nodes having different power dependencies, and wherein the shared resource is to be a downstream component that serves as a node of another shared resource; and
place the shared resource in the low power state if,
one or more downstream components of the shared resource are idle, and
the idle duration associated with the active workload exceeds an energy break-even time associated with the low power state, wherein entering the low power state is to depend at least in part on a status of an upstream shared resource and one or more downstream components, and wherein each of the one or more downstream components is to autonomously manage a power state associated with the downstream component.

7. The medium of claim 6, wherein the instructions, if executed, cause the platform to access an operating system timer to identify the idle duration.

8. The medium of claim 6, wherein the instructions, if executed, cause the platform to receive the idle duration from an interrupt handler unit.

9. The medium of claim 6, wherein the instructions, if executed, cause the platform to place the shared resource in the low power state if,
one or more downstream components of the shared resource are idle, and
a latency associated with the low power state does not exceed the latency tolerance requirement.

10. The medium of claim 6, wherein the instructions, if executed, cause the platform to place the shared resource in the low power state if,
one or more downstream components of the shared resource are idle, and
the resource requirement does not include the shared resource.

11. An apparatus comprising:
logic, implemented at least partly in one or more of configurable logic or fixed functionality logic hardware, to,
identify runtime information associated with an active workload of a platform, wherein the runtime information is to include one or more of an idle duration associated with the active workload, a latency tolerance requirement associated with the active workload, or a resource requirement associated with the active workload,
make an active idle state determination for the platform based on at least in part the runtime information,
control a low power state of a shared resource on the platform concurrently with an execution of the active workload to reduce platform power consumption during execution of the active workload based on at least in part the active idle state determination, wherein the shared resource is to be one of a plurality of shared resources that form a power hierarchy including different nodes having different power dependencies, and wherein the shared resource is to be a downstream component that serves as a node of another shared resource, and
place the shared resource in the low power state if,
one or more downstream components of the shared resource are idle, and
the idle duration associated with the active workload exceeds an energy break-even time associated with the low power state, wherein entering the low power state is to depend at least in part on a status of an upstream shared resource and one or more downstream components, and wherein each of the one or more downstream components is to autonomously manage a power state associated with the downstream component.

12. The apparatus of claim 11, wherein the logic is to access an operating system timer to identify the idle duration.

13. The apparatus of claim 11, wherein the logic is to receive the idle duration from an interrupt handler unit.

14. The apparatus of claim 11, wherein the logic is to place the shared resource in the low power state if,
one or more downstream components of the shared resource are idle, and
a latency associated with the low power state does not exceed the latency tolerance requirement.

15. The apparatus of claim 11, wherein the logic is to place the shared resource in the low power state if,
one or more downstream components of the shared resource are idle, and
the resource requirement does not include the shared resource.

16. A platform comprising:
a shared resource, wherein the shared resource is to be one of a plurality of shared resources that form a power hierarchy including different nodes having different power dependencies, and wherein the shared resource is to be a downstream component that serves as a node of another shared resource; and logic to,
identify runtime information associated with an active workload of the platform, wherein the runtime information is to include one or more of an idle duration associated with the active workload, a latency tolerance requirement associated with the active workload, or a resource requirement associated with the active workload,
make an active idle state determination for the platform based on at least in part the runtime information,
control a low power state of the shared resource concurrently with an execution of the active workload to reduce platform power consumption during execution of the active workload based on at least in part the active idle state determination, and
placing one or more downstream components of the shared resource in a low power state, wherein the logic is to place the shared resource in the low power state if,
at least one of the one or more downstream components is idle, and
the idle duration associated with the active workload exceeds an energy break-even time associated with the low power state, wherein entering the low power state is to depend at least in part on a status of an upstream shared resource and one or more downstream components, and wherein each of the one or more downstream components is to autonomously manage a power state associated with the downstream component.

17. The platform of claim 16, wherein the logic is to access an operating system timer to identify the idle duration.

18. The platform of claim 16, further including an interrupt handler unit, wherein the logic is to receive the idle duration from the interrupt handler unit.

19. The platform of claim 16, further including one or more downstream components of the shared resource, wherein the logic is to place the shared resource in the low power state if,
at least one of the one or more downstream components is idle, and
a latency associated with the low power state does not exceed the latency tolerance requirement.

20. The platform of claim 16, further including one or more downstream components of the shared resource, wherein the logic is to place the shared resource in the low power state if,
at least one of the one or more downstream components is idle, and
the resource requirement does not include the shared resource.

* * * * *